(No Model.)
I. G. TODD.
DRILL CHUCK.
No. 282,015. Patented July 24, 1883.
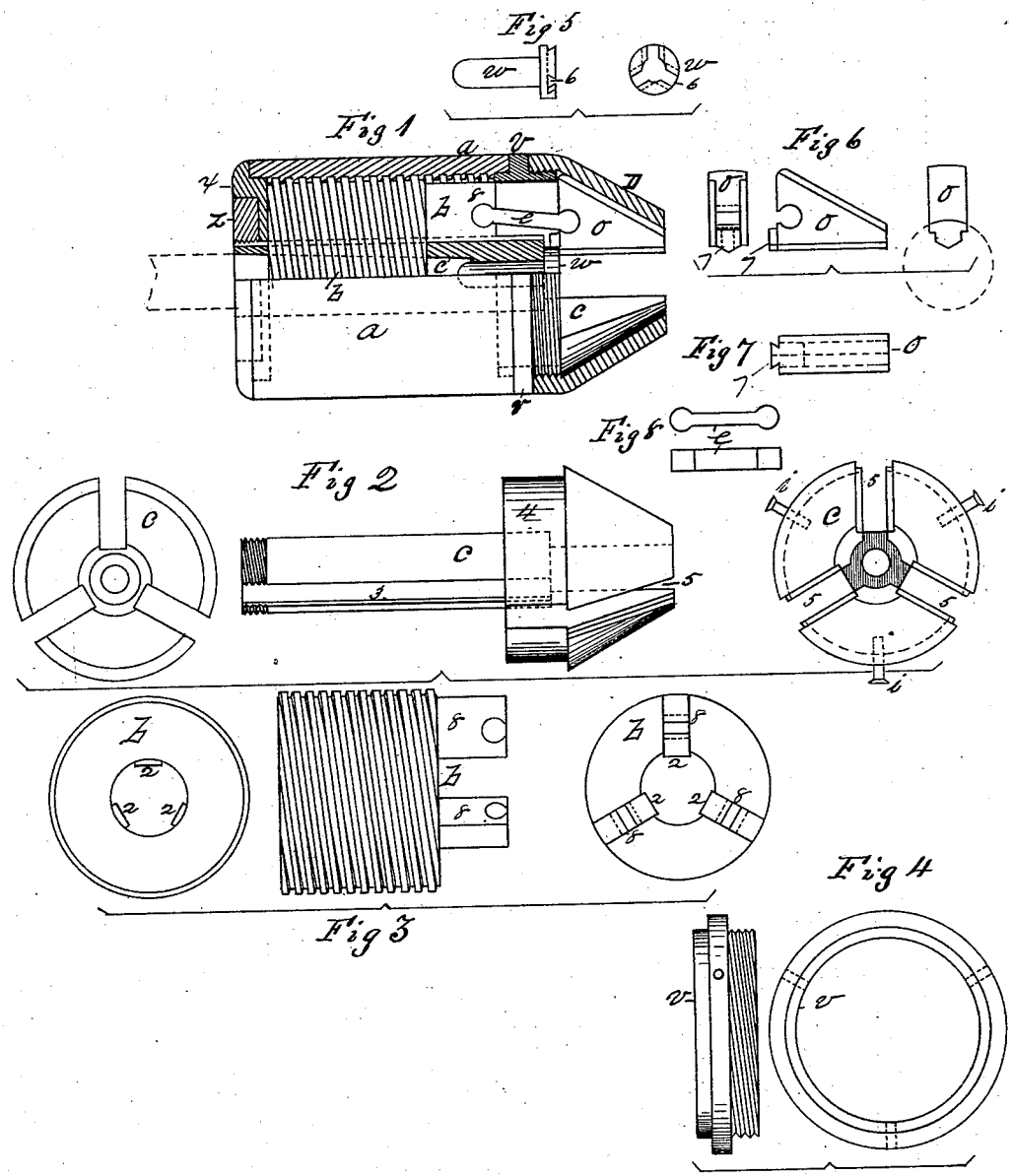
Witnesses
R. F. Hyde
Wm H Chapin
Inventor
Ira G Todd
by Henry A Chapin
Atty

UNITED STATES PATENT OFFICE.

IRA G. TODD, OF BRIDGEPORT, CONNECTICUT.

DRILL-CHUCK.

SPECIFICATION forming part of Letters Patent No. 282,015, dated July 24, 1883.

Application filed April 10, 1883. (No model.)

*To all whom it may concern:*

Be it known that I, IRA G. TODD, a citizen of the United States, residing at Bridgeport, in the county of Fairfield and State of Connecticut, have invented new and useful Improvements in Drill-Chucks, of which the following is a specification.

This invention relates to improvements in drill-chucks; and it consists in an improved construction of the jaws and jaw-carrier and connecting devices therebetween, and in improved means for preventing particles of metal and other matter from getting into the chuck and obstructing the proper operation of the parts thereof which actuate the jaws.

In the drawings forming part of this specification, Figure 1 is a side elevation, partly in section, of a drill-chuck constructed according to my invention. Fig. 2 shows the jaw and carrier-guide in three views. Fig. 3 illustrates the jaw-carrier in three views. Fig. 4 is a face and edge view of the screwed collar. Fig. 5 shows the dirt-plug in two views. Figs. 6 and 7 show different views of the jaw. Fig. 8 shows side and edge views of the jaw and carrier-link.

In the drawings, $a$ is the shell, having a screw-thread on its interior. $b$ is the jaw-carrier, having a thread thereon to correspond with that on the shell $a$. $c$ is the jaw and carrier-guide. $o$ indicates one of the jaws. $w$ is the dirt-plug. $e$ is the jaw and carrier-link. $v$ is a collar. $x$ is the rear bearing for the shell $a$. $z$ is a nut. $i$ indicates pins securing collar $v$ to the guide $c$. D is the conical jaw-case.

The jaw and carrier-guide $c$ is provided with the three jaw-slots 5 and the grooves 3, which extend from the base of said slots to the rear end of the shank of said guide, said shank having a screw-thread thereon, as shown, to provide for screwing the nut $z$ onto it. The collar $v$, having a screw-thread thereon, is secured upon the part 4, of the guide $c$, by the pins $i$. The shank of said guide is bored clear through it; but, as shown in Fig. 1, that portion of its perforation directly back of the jaws $o$ is of a suitable diameter to receive in it the shank of the dirt-plug $w$, while from the latter to the rear end of the shank the perforation is of the usual form for receiving the end of a mandrel upon which the chuck is supported while being used.

The dirt-plug $w$ has a head which is provided with three dovetail grooves, 6, and the rear end of each jaw $o$ is provided with a dovetail projection, 7, which engages in one of grooves 6 in the head of the plug, and whereby said plug and jaws are so connected that they have a simultaneous movement back and forth, and the aforesaid perforation through the shank $c$ has its forward end closed against the admission of anything therein, and the head of said plug, which constantly occupies a position at the base of the jaws $o$, serves to prevent any dirt from passing back beyond the latter and getting into the jaw-slots 5 of the carrier and obstructing the free operation of the jaws.

The carrier $b$ is adapted to be moved back and forth on the shank of the guide $c$ by turning the shell $a$, and is provided with three arms, 8, which extend forward, and, when the carrier is moved toward the nose of the chuck, enter that part of the grooves 5 in the guide $c$ which are cut through the part 4 thereof. Three projections, 2 2 2, on a line with the inner edges of the arms 8, are formed on the face of the hole through the carrier, and when the latter is placed on the shank of guide $c$ said projections enter the grooves 3 in the said shank. A circular perforation is made through the arms 8 near the end thereof, having one side open, and a like perforation is made in the rear end of the jaws $o$, which perforations provide receptacles for the circular heads of the link $e$, as shown in Fig. 1, whereby a yielding connection is made between the carrier $b$ and the jaws $o$.

The conical jaw-case D fits over the conical end of the guide $c$, and is screwed to the collar $v$. The case D provides a bearing for the outer edges of the jaws $o$ when the latter are driven against it by the movement of the carrier $b$, whereby they are caused to clamp a drill in the usual way.

The parts of the chuck in the rear of the collar $v$ are secured in a working position upon the guide $c$ by the nut $z$, which screws onto the end of the guide-shank and into a recess in the rear shell-bearing, $x$.

The within-described mode of connecting the carrier $b$ and jaws $o$ by the yielding link-connection $e$ obviates almost entirely any danger of breakage of the connection between those parts should the jaws get caught and resist the action of the shell *a* and the carrier *b*.

The connection of the jaws *o* with the plug *w* by means of the grooves 6 in the head thereof and the projections 7 on the jaws permits the jaws to have a movement toward and from the axis of the plug, while the jaws and the plug move to and fro to clamp and unclamp a drill.

What I claim as my invention is—

1. In a drill-chuck, the combination, with the carrier *b* and the jaws *o*, of the circular-headed link *e*, all as set forth.

2. In combination, the centrally-projected guide *c*, the plug *w*, and the jaws *o*, said jaws being attached to said plug by means substantially as described, to permit said jaws to move toward and from the axis of said plug, substantially as set forth.

3. The combination, with the shell *a* and case D, of the carrier *b*, link *e*, and plug *w*, substantially as set forth.

IRA G. TODD.

Witnesses:
H. A. CHAPIN,
R. F. HYDE.